(12) United States Patent
Hultén et al.

(10) Patent No.: US 11,873,042 B2
(45) Date of Patent: Jan. 16, 2024

(54) METHOD AND SYSTEM FOR CONTROLLING VEHICLE STEERING (71) Applicant: SENTIENT IP AB, Gothenburg (SE)

(72) Inventors: Johan Hultén, Gothenburg (SE); Jochen Pohl, Partille (SE); Henrik Weiefors, Gothenburg (SE); Ulf Löfqvist, Bredared (SE)

(73) Assignee: SENTIENT IP AB, Gothenburg (SE)

( * ) Notice: Subject to any disclaimer, the term of this patent is extended or adjusted under 35 U.S.C. 154(b) by 723 days.

(21) Appl. No.: 16/977,256

(22) PCT Filed: Mar. 16, 2019

(86) PCT No.: PCT/SE2019/050237
§ 371 (c)(1),
(2) Date: Sep. 1, 2020

(87) PCT Pub. No.: WO2019/182496
PCT Pub. Date: Sep. 26, 2019

(65) Prior Publication Data
US 2020/0406964 A1    Dec. 31, 2020

(30) Foreign Application Priority Data

Mar. 20, 2018   (SE) .................................. 1850315-1

(51) Int. Cl.
*B62D 6/00*   (2006.01)
*B62D 5/00*   (2006.01)

(52) U.S. Cl.
CPC .............. *B62D 6/008* (2013.01); *B62D 5/005* (2013.01); *B62D 5/008* (2013.01)

(58) Field of Classification Search
CPC ......... B62D 6/008; B62D 5/005; B62D 5/008
(Continued)

(56) References Cited

U.S. PATENT DOCUMENTS

2005/0234622 A1* 10/2005 Pillar ..................... B60L 3/12
                                                        701/41
2008/0243340 A1* 10/2008 Hung ..................... B62D 5/09
                                                        251/129.01
(Continued)

FOREIGN PATENT DOCUMENTS

| DE | 20 2011 003716 | 8/2012 |
| EP | 2 070 804 | 6/2009 |
| WO | 2017/135884 | 8/2017 |

OTHER PUBLICATIONS

International Search Report issued in parent PCT/SE2019/050237, dated Jun. 13, 2019, pp. 1-8.
(Continued)

*Primary Examiner* — Krishnan Ramesh
(74) *Attorney, Agent, or Firm* — Jeffrey S. Melcher; Melcher Patent Law PLLC (57) ABSTRACT

A method and a system for vehicle steering control by controlling a feedback torque actuator (130) in series with an angle overlay actuator (140) in a vehicle steering system (100) to provide a target feedback torque and a target overlay angle. The feedback torque actuator (130) is arranged above the angle overlay actuator (140). The angle overlay actuator (140) is controlled so that a variable steering ratio and an additional overlay angle are provided, and the feedback torque actuator (130) is controlled using a reference generator so that the torque is controlled to provide a target steering feel, resulting in the angle overlay being controlled at the same time as the steering-wheel torque being controlled whereby a target overlay angle and a good steering feel are achieved.

24 Claims, 3 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2009/0271070 | A1* | 10/2009 | Feller | B62D 6/008 |
| | | | | 701/41 |
| 2010/0072738 | A1* | 3/2010 | Szabela | B62D 5/04 |
| | | | | 280/771 |
| 2010/0168964 | A1* | 7/2010 | Higashi | B62D 5/008 |
| | | | | 701/42 |
| 2017/0017734 | A1* | 1/2017 | Groh | G06F 30/20 |
| 2017/0113714 | A1* | 4/2017 | Guerra | B62D 6/10 |
| 2018/0127025 | A1* | 5/2018 | Wijffels | B62D 15/025 |
| 2018/0281844 | A1* | 10/2018 | Wijffels | B62D 6/002 |
| 2018/0281845 | A1* | 10/2018 | Wijffels | B62D 5/0457 |

OTHER PUBLICATIONS

Written Opinion issued in parent PCT/SE2019/050237, dated Jun. 13, 2019, pp. 1-3.

* cited by examiner

METHOD AND SYSTEM FOR CONTROLLING VEHICLE STEERING

TECHNICAL FIELD

The present invention relates to a method for vehicle steering control in a steering system having the features of the preamble of claim 1.

The invention also relates to a system for vehicle steering control having the features of the first part of claim 15.

BACKGROUND

Vehicle steering consists of two parts, namely steering feel control (SFC) and steering position control (SPC), respectively. For the steering feel control, it is the control of the steering-wheel torque that the driver feels that is the subject matter, and in steering position control, it is the control of the road-wheel angles, and specifically for a front-wheel steered vehicle, the control of the front axle road-wheel angle.

For SPC, it is possible to use Steer-by-Wire (SbW) or to introduce a delta angle somewhere between the steering-wheel angle and the road-wheel angle, a so-called angle overlay actuator. For angle overlay actuators, two concepts are dominating the hardware scene, namely planetary gears and harmonic drives.

For SFC, Hydraulic Power Assisted Steering (HPAS) has been widely used, and now Electric Power Assisted Steering (EPAS) is used. In order to give the driver feedback in the SFC, the EPAS is used, and will in this document be called a feedback torque actuator.

In e.g. DE102011003716(A1), the angle overlay actuator is mounted above the SFC actuator, i.e. towards the steering wheel side. One reason for that is that the angle overlay actuator is then on the low torque side (as the assistance is actuated between the angle overlay actuator and the road wheels). With such an arrangement, there are a couple of drawbacks, namely:

The driver will be able to feel the result of the angle overlay acuator movement as there is an inertia in the angle overlay actuator deteriorating the steering feel.

For the angle overlay actuator to be able to move the front road wheels, the steering wheel needs to be held still or at least not being able to move arbitrarily. In the case of lane keeping aid, auto pilot or full autonomous driving, the driver is not necessarily holding the steering wheel, and hence the vehicle motion can not be controlled by the use of a control of an angle overlay actuator alone.

In e.g. US2010168964(A1), there is an assistance actuator below the angle overlay actuator and a compensation torque actuator above the angle overlay actuator. This compensation torque actuator is used to reduce the effect of the acceleration of the angle overlay actuator and thus reducing the effect of the inertia effect from accelerating the parts of the angle overlay actuator. However, apart from that, the compensation torque actuator does not influence the steering feel. It just reduces the negative effect of the angle overlay actuator.

In US2010168964(A1), there are two actuators that give assistance to the driver, one assistance actuator and one compensation torque actuator. This is a complex arrangement since two actuators are needed for providing steering assistance, which also results in an expensive solution which in addition is space demanding.

Current state-of-the-art steering systems for SFC and SPC suffer from the above-mentioned problems.

SUMMARY

It is therefore an object of the present invention to provide a method and a system through which one or more of the above-mentioned problems and shortcomings are overcome.

Therefore, a method and a system respectively as initially referred to are provided having the characterizing features of the respective independent claims.

Advantageous embodiments are given by the respective appended dependent claims and are described in the detailed description to follow.

Particularly, in order to solve the problem of having both good feedback, good response and controllability for e.g. variable gear ratio and active safety functions, a new system design and a new control particularly based on the following principles are proposed:

to use an angle overlay actuator below the feedback assistance actuator, and to give the driver disturbance-free steering feedback, and hence no disturbances from the road or the angle overlay actuator.

It will be appreciated that features of the invention are susceptible to being combined in any combination without departing from the scope of the invention as defined by the accompanying claims.

BRIEF DESCRIPTION OF THE DRAWINGS

The invention will in the following be further described, in a non-limiting manner, and with reference to the accompanying drawings, in which.

DETAILED DESCRIPTION

Figure 1:
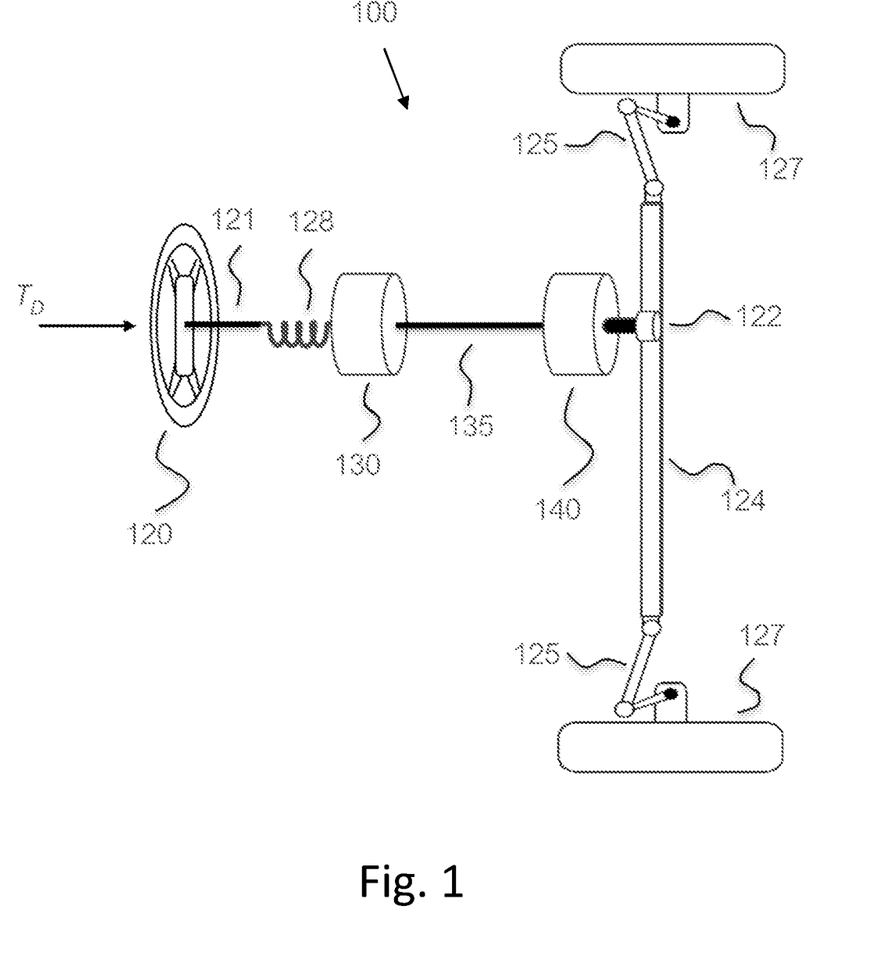
FIG. 1 schematically illustrates a steering system with feedback torque actuator and angle overlay actuator according to a first exemplary embodiment, FIG. 2 schematically illustrates a second exemplary embodiment of a steering system with feedback torque actuator, angle overlay actuator and hydraulic assistance actuator, and FIG. 3 schematically illustrates a control diagram for the control of a feedback torque actuator and an angle overlay actuator.
Figure 2:
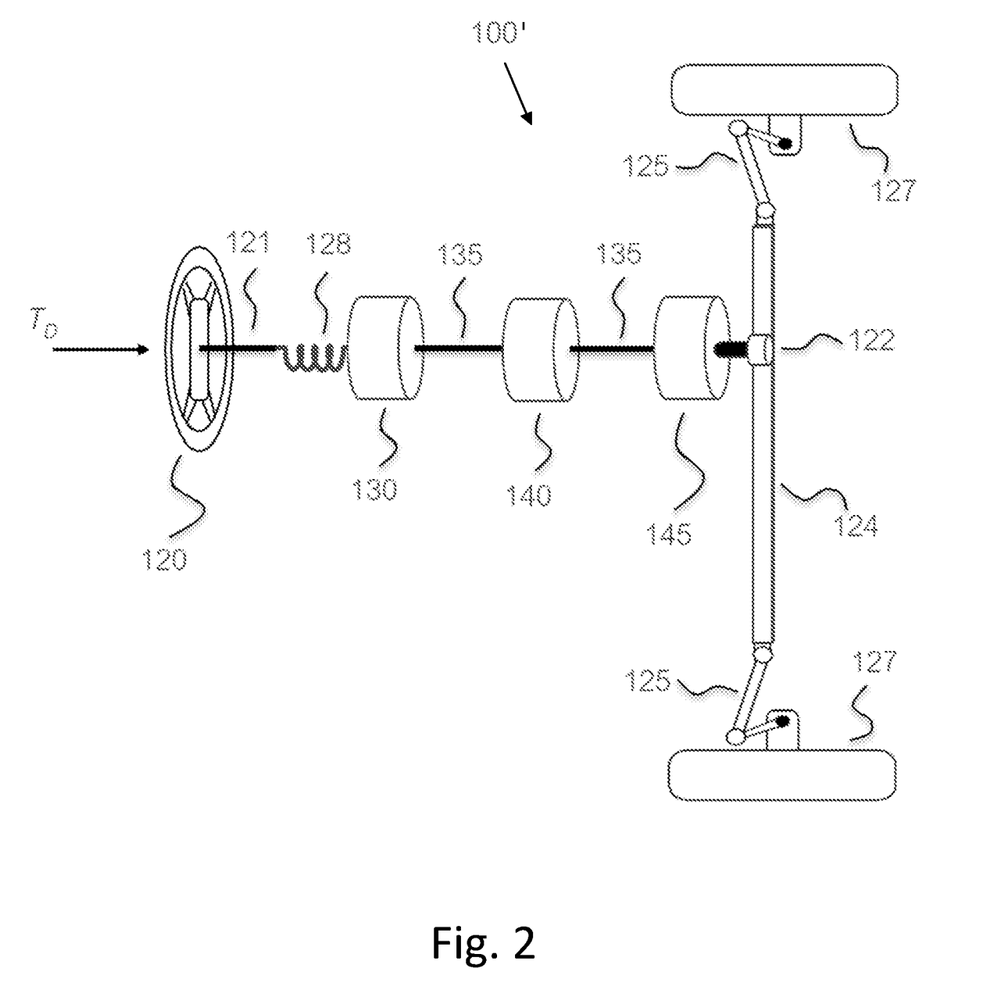

FIGS. 1 and 2 show the components of the system according to exemplary embodiments of the present invention.

For the purposes of the present invention, and to facilitate understanding thereof, the following definitions are given, which will be relied upon in the detailed description of advantageous embodiments:

Vehicle steering consists of two parts, namely steering feel control (SFC) and steering position control (SPC), respectively. For the steering feel control, it is the control of the steering-wheel torque that the driver feels that is the subject matter, and in steering position control, it is the control of the road-wheel angles, and specifically for a front-wheel steered vehicle, the control of the front axle road-wheel angle, here referred to as the steering angle (see the definition below).

A steering angle is an angle in the steering system that influences the lateral acceleration or curvature of the vehicle, measured somewhere in the steering system, where such steering angles can be:

The front-wheel angle and in the case for e.g. Ackermann steering, the steering angle is defined as the mean value of the angles of the two front wheels.

The articulation angle of an articulated vehicle.

The rear-wheel steering angle in the case of a rear-wheel steered vehicle.

A combination of the front-wheel angle and the rear-wheel angle in the case of an all-wheel steered vehicle.

A steering position actuator is an actuator which can be used for SPC, i.e. to influence one or more of the steering actuator states, such as the rear wheel steering angle, the individual steering angles of the wheels, the axle braking torque or force, the wheel braking torque or force, the driving torque or force on the individual axles, the driving torque or force on the individual wheels, the camber angle on each axle, or the camber angle on each wheel. In the case of front-wheel steering, a steering position actuator is an actuator that can be used to influence the steering angle.

A specific type of steering position actuator is an angle overlay actuator. An angle overlay actuator is an actuator that is used to achieve a relative angle somewhere in the steering column. Two hardware concepts are dominating the angle overlay actuator scene, namely planetary gears (such as in the BMW concept for "Front Active Steering") and harmonic drives (such as in the Audi variable steering gear ratio).

A state is defined as a translational or rotational position, velocity or acceleration, or from these before-mentioned states derived states such as e.g. a vehicle slip angle, which is the angle between the vehicle local x-axis and the vehicle speed vector.

For SFC, Hydraulic Power Assisted Steering (HPAS) has been widely used, and now Electric Power Assisted Steering (EPAS) is used. In order to give the driver feedback in the SFC, the EPAS is used, and will in this document be called a feedback torque actuator.

Heavy vehicles and farming vehicles such as e.g. tractors require great steering assistance levels. Therefore, the assistance actuators of today are predominantly hydraulic assistance driven (because the fact that hydraulics has high power density). That means that if one would like greater controllability than standard hydraulic assistance valves result in, for functions such as e.g. Lane Keeping Aid (LKA), it is possible to add an EPAS actuator above the HPAS actuator, i.e. towards the steering wheel side. Therefore, for farming equipment and heavy vehicles, a combination of HPAS and EPAS is now emerging, where the EPAS is mounted on the steering wheel side of the HPAS system. The HPAS actuator is used to achieve a torque reduction, an assistance, and is therefore called hydraulic assistance actuator.

An actuator is a mechanism or system that is operated mechanically or by an ECU and converts a source of energy, typically electric current, hydraulic fluid pressure, or pneumatic pressure, into a motion, force or torque.

Variable Gear Ratio (VGR) or variable steering gear ratio is a function to control the angle overlay actuator in such a way that the ratio between the steering wheel and the road wheels follows a speed dependent function. By controlling the angle overlay actuator in such a way, the steering response can be made vehicle speed dependent.

Also other functions, such as e.g. safety functions can benefit from an angle overlay actuator. Such safety functions are e.g. oversteer compensation, where the steering angle is controlled in such a way that the oversteering is reduced by a counter steering, or understeer compensation, where the function controls the steering angle in such a way that the tyre-to-road friction is used in an optimal way, reducing otherwise over-exaggerated steering angles. By these examples of steering angle control, the steering wheel does not necessarily need to move, as the angle overlay actuator adds the angle necessary to move the steering angle without moving the steering-wheel angle.

A torsion-bar torque is a torque measured by the use of a sensor that is sensitive to a twist of a specific torsion bar that is mounted somewhere in the steering column.

A steering-wheel torque is the torque applied by the driver to the steering wheel. This steering-wheel torque is normally approximated by the torsion-bar torque.

A driver torque is equal to the steering-wheel torque.

A signal bus is a transmission path on which signals can be read and/or transmitted.

An input signal can for example be the measure of a torque applied by the driver via the steering wheel, measured somewhere between the steering wheel and the wheel, or a signal derived from this quantity.

An ECU is an electric control unit that is used to read analogue sensor signals and digital signals, that can come over e.g. a signal bus, perform any type of computations, such as e.g. perform a control task and actuate actuators, either via a sent analogue or digital signal or by directly controlling e.g. an electric motor from a motor control stage.

Controllability describes the ability of an external input to move the internal state, an actual value, of a system from any initial state to an arbitrary other final state, a target value, in a finite time interval, thus minimising the difference between the target value and the actual value, i.e. the control error.

A lateral acceleration feedback torque is a torque felt by the driver that corresponds to the lateral acceleration of the vehicle.

The lateral acceleration torque is calculated from a vehicle model, which uses vehicle speed and steering angle as input, and give the lateral acceleration as output. The lateral acceleration feedback is a function of the lateral acceleration calculated from the vehicle model.

A tyre friction torque is the friction between the tyres and the road or a model of this friction.

The mathematical model of the tyre friction torque is a model of an angle or angular speed driven hysteresis. The mathematical model of the tyre also contains a relaxation part such that as the tyre rolls, the torque of the hysteresis will have a relaxation length so that the hysteresis torque decreases with the rolling length of the tyre. The relaxation can preferably be the well-known half-life exponential decay function. The model of the tyre friction is the combination of the hysteresis and the relaxation so that e.g. an increase owing to the hysteresis torque can happen at the same time as the torque decrease owing to the relaxation. The resulting torque of the model is the sum of the two parts.

A steering system friction or a friction torque is the friction of the parts of the linkage of the steering system or a model of this friction.

The mathematical model of the steering system friction torque is a model of an angle or angular speed driven hysteresis. The maximum torque in the hysteresis can be shaped by a function so that the maximum torque is different on centre compared to off centre.

A damping torque occurs owing to damping of the tyres and the steering system or a model of this damping.

The mathematical model of the damping torque consists of some damping constant times an angular speed or translational speed, such as e.g. the rack velocity, measured somewhere in the linkage between the road wheels and the steering wheel. The damping constant can be such that the damping has a blow-off, such that the damping constant decreases for great angular or translational speeds. The damping constant can be vehicle speed dependent as well as different for steering outwards compared to inwards. The damping constant can also be a function of the steering-wheel or torsion-bar torque.

A returnability torque comes from the geometry of the steering system or a model of the steering system.

A returnability torque is a vehicle speed dependent and steering-wheel angle dependent torque.

These torque contributions can all be vehicle speed dependent. The torque contributions can also be calculated via mathematical models or sensed via sensors in the vehicle or steering system.

A compensation torque is the sum of the above-mentioned tyre friction torque, the friction torque, the damping torque and the returnability torque. The parts of the compensation torque are calculated from mathematical models of the different torque parts.

A reference generator concept for steering feel is a closed loop control method where first a reference or target value is calculated and then the steering assistance is controlled to minimize the error between the target value and the corresponding measured one. Reference generator concepts for steering can be of two kinds, namely torque reference generator concepts and angle reference generator concepts.

A torque reference generator is a steering feel control concept where the target steering-wheel torque is calculated in a reference generator, and this reference steering-wheel torque is then used to control, by the use of closed loop control, the feedback torque actuator to this reference torque.

A target steering-wheel torque is the sum of the lateral acceleration feedback torque, the above-mentioned tyre friction torque, the friction torque, the damping torque and the returnability torque.

An angle reference generator is a steering feel control concept where the target assistance actuator angle is calculated in a reference generator, and this reference feedback torque actuator angle is then used to control the feedback torque actuator to this reference angle.

A target steering angle, in the angle reference generator, is based on the equation of the target steering-wheel torque, where the target steering-wheel torque is the sum of the lateral acceleration feedback torque, the above-mentioned tyre friction torque, the friction torque, the damping torque and the returnability torque. If the target steering-wheel torque, in this equation is changed to the sensed or estimated driver torque, the steering angle can be derived out of this steering angle dependent equation. This derived steering angle is the target steering angle of the angle reference generator.

The parts of the target steering-wheel torque are calculated from mathematical models of the different torque parts.

A target steering-wheel angle can be calculated from the equation of steering feel, where the torsion-bar torque should be equal to the target steering-wheel torque as described above. Now, from this equation, a target steering-wheel angle can be calculated.

The parts of the target steering-wheel angle are calculated from mathematical models of the different torque parts.

A vehicle state controller, is defined as a dynamic function for achieving a target state in a vehicle in a controlled manner. That is, to minimise the difference between the target state and the actual state, i.e. the control error, in a controlled way.

A PID controller is a proportional-integral-derivative controller, which is a control loop feedback mechanism widely used in industrial control systems and a variety of other applications requiring continuously modulated control. A PID controller continuously calculates an error value, e(t), as the difference between a target value and a measured process value and applies a correction based on proportional, integral, and derivative terms (denoted P, I, and D respectively) which give their name to the controller. In practical terms it automatically applies accurate and responsive correction to a control function. An everyday example is the cruise control on a road vehicle; where external influences such as gradients would cause speed changes, and the driver has the ability to alter the desired set speed. The PID algorithm restores the actual speed to the desired speed in the optimum way, without delay or overshoot, by controlling the power output of the vehicle's engine. A PID controller, the I-part of a PID controller can sometimes suffer from integral windup.

Integral windup, also known as integrator windup or reset windup, refers to the situation in a PID feedback controller where a large change in target value occurs (say a positive change) and the integral terms accumulates a significant error during the rise (windup), thus overshooting and continuing to increase as this accumulated error is unwound (offset by errors in the other direction). The specific problem is the excess overshooting.

Anti-windup is a term for a set of solution to the problem of integral windup. This problem can be addressed by:
Initialising the controller integral to a desired value, for instance to the value before the problem.
Increasing the target value in a suitable ramp.
Disabling the integral function until the to-be-controlled process variable has entered the controllable region.
Preventing the integral term from accumulating above or below pre-determined bounds.
Back-calculating the integral term to constrain the process output within feasible bounds.

A vehicle state actuator, is an actuator that when actuated influences one or several vehicle states. Vehicle state actuators are brakes, engine, controllable four-wheel-drive clutches, controllable differentials, active dampers, electric or hydraulic wheel motors and electrically or hydraulically driven axles.

A target value, reference value or request is a set point for the actuator that is achieved by the use of either a closed loop controller and/or a feed-forward controller.

A vehicle model is a mathematical model that transforms a road-wheel angle and a vehicle speed to a number of vehicle yaw and/or lateral states, namely vehicle yaw rate and acceleration, vehicle lateral speed and acceleration and vehicle body sideslip angle.

Transformation is defined as a mathematical function or lookup table with one input value used to produce one output value. That means that a transformation can be used, with its tuneable parameters, to create a relation between the input value and the output value with arbitrary tuneable shape. A transformation can have time-varying parameters that are even dependent on other values, a so-called gain scheduling, so that the transformation is a function with parameters that themselves are functions. An example of such a transformation is a vehicle state to driver torque relation where the relation is a vehicle speed dependent continuously rising, degressive shaped function.

A steering-wheel torque measurement is a torque measured in the steering column or steering wheel or a force measured in the steering rack times the torque ratio between the steering rack and the steering wheel.

A steering angle is here referred to as any angle between the steering wheel and the road wheel times the ratio between the angular degree of freedom and the steering-wheel angular degree of freedom. It can also be a rack position times its ratio between the rack translational degree of freedom to the steering-wheel angular degree of freedom.

FIG. 1 is a schematic figure of a steering system 100. There is a linkage between front axle road wheels 127 and an angle overlay actuator 140. The linkage consists of a steering rack 124 with associated tie rods 125 connected via a pinion 122 to the angle overlay actuator 140. The angle overlay actuator 140 consists of a planetary gear or a harmonic drive, an overlay angle measurement sensor and an ECU. The steering column incorporates a torsion bar 128 with a torque sensor for measuring the steering torque above a feedback torque actuator 130, i.e. towards the steering wheel side. The feedback torque is actuated by the feedback torque actuator 130, which consists of an assistance motor and an ECU. The driver applies the driver torque, $T_D$, in the steering wheel 120. Between the feedback torque actuator 130 and the angle overlay actuator 140, there is a column axle 135.

FIG. 2 is a schematic figure of an alternative embodiment of a steering system 100'. There is a linkage between front axle road wheels 127 and an angle overlay actuator 140. The linkage consists of a steering rack 124 with associated tie rods 125 connected via a pinion 122 to an hydraulic assistance actuator 145 consisting of a hydraulically assisted steering rack (or similar in the case of Pitman arm based steering systems or Orbitrol valves in tractors or construction equipment). Between the hydraulic assistance actuator 145 and the feedback torque actuator 130, there is an angle overlay actuator 140. The angle overlay actuator 140 consists of a planetary gear or a harmonic drive, an overlay angle measurement sensor and an ECU. The steering column incorporates a torsion bar 128 with a torque sensor for measuring the steering torque above a feedback torque actuator 130, i.e. towards the steering wheel side. The feedback torque is actuated by the feedback torque actuator 130, which consists of an assistance motor and an ECU. The driver applies the driver torque, $T_D$, in the steering wheel 120. Between the feedback torque actuator 130, the angle overlay actuator 140 and the hydraulic assistance actuator 145, there are column axles 135.

Figure 3:
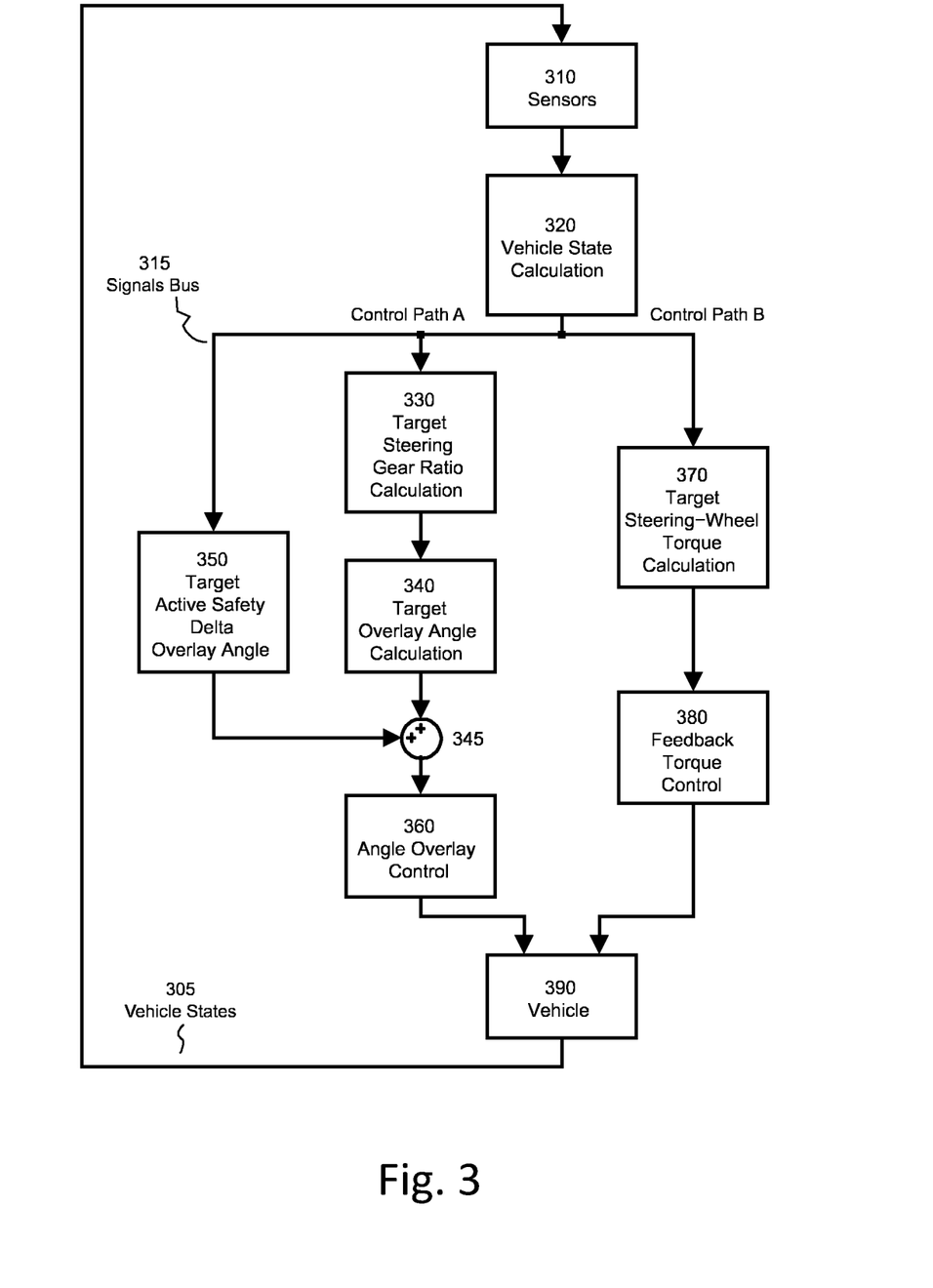

FIG. 3 is a control diagram for the control of an angle overlay actuator control, path A, and a feedback torque actuator control, path B. A vehicle 390, with its several subsystems, has at every time a number of states, where a state is defined as a translational or rotational position, velocity or acceleration, or a force or torque. These states are schematically represented by a dashed line 305. The vehicle 390 is equipped with a series of sensors 310 for direct or indirect measurements of the vehicle states. Several sensors can be used such as a torsion-bar torque sensor, a steering-wheel angle sensor, vehicle wheel speed sensors, a vehicle yaw rate sensor, a vehicle lateral acceleration sensor or a cluster of vehicle velocities and rotational speeds. The sensed or measured values of the vehicle states 305 are communicated to the control steps by the use of a signal bus 315, where a signal bus is a transmission path on which signals can be read and/or transmitted. For the control of the vehicle 390, there are two control paths (A and B) namely an angle overlay actuator control, path A, indicated by 310-320-330-340-345-350-360-390 and a feedback torque actuator control, path B, indicated by 310-320-370-380-390.

The present invention provides a system and a method respectively for controlling a feedback torque actuator 130 and an angle overlay actuator 140 in a steering system 100, where these two actuators are so arranged that the feedback torque actuator 130 is closest to the steering wheel and the angle overlay actuator 140 is somewhere between the feedback torque actuator and the road wheels, and it is based on the fact that it incorporates a number of steps for a steering angle control and a number of steps for a feedback torque control.

In a first embodiment, the control of the angle overlay actuator incorporates the following steps:
1. Measurement of at least one input signal with the aid of a sensor 310. The following signals are preferably needed:
   The vehicle speed is calculated from information achieved by using either standard wheel speed sensors (so called ABS sensors) or a drive axle speed sensor. In the case of wheel speed sensors, the vehicle speed can be calculated from the speeds of the wheels of the non-driven axle as a mean value or in the case of all-wheel drive, more advanced methods are needed, but well known for the person skilled in the art. In the case of a drive axle speed sensor, the vehicle speed is simply the drive axle speed times the ratio between the drive axle and the wheel speed. Such a drive-axle-speed based vehicle speed should be compensated for wheel spin in the case of using more power than the tyre-to-road friction can take.
   In order to calculate the angle over the angle overlay actuator and one of the angles below or above the angle overlay actuator two of the three angles below needs to be measured with the aid of sensors. The one not measured can be calculated from the two others as the angle over the angle overlay actuator is the difference between the angles above, i.e. the steering-wheel angle, and the angle below, i.e. the steering angle.
     The steering angle is measured somewhere below (i.e. in the direction towards the road wheels) the angle overlay actuator by the use of an angle sensor located somewhere in the steering column or if located elsewhere in the steering system it should be translated to the steering column coordinate system by using the ratio between the sensor position and the column. It can also be measured by the use of a position sensor in the steering rack times the ratio to the steering column.
     The angle overlay actuator is measured by the use of a sensor located so that it can sense the relative angle over the angle overlay actuator.
     The steering-wheel angle is measured somewhere above (i.e. in the direction towards the steering wheel) the angle overlay actuator by the use of an angle sensor.
2. Calculation 320 of the steering angle or the steering-wheel angle, the overlay angle and the vehicle speed by the use of the before-mentioned sensor signal(s).
3. Calculation of a target ratio between the steering wheel and the road wheel 330, a so called variable gear ratio.
4. From said variable gear ratio, calculation of a target overlay angle 340 so that with this overlay angle and current steering-wheel angle or steering angle, the target gear ratio is achieved.
5. Controlling, by the use of a controller, the actual overlay angle 360 so that the deviation between the target overlay angle and the actual overlay angle is minimised.

In a second variant for the control of the angle overlay actuator, an additional overlay angle is received from a safety function 350 such as e.g. an oversteer compensation or understeer compensation function or any other safety function that might be used for achieving an additional overlay angle out of the scope of the present invention. The target overlay angle is then the sum 345 of the target overlay angle from the variable gear ratio and the additional overlay angle from said active safety function. And again, the angle overlay actuator should be controlled, by the use of a controller, so that the deviation between the target overlay angle and the measured overlay angle is minimized.

In this embodiment, the control of the feedback torque actuator incorporates the following steps:
1. Measurement of at least one input signal with the aid of a sensor 310. The following signals are preferably needed:
    The vehicle speed, as described above.
    The steering angle, as described above.
2. By the use of the before-mentioned sensor(s), the steering angle and the vehicle speed is calculated 320.
3. In a third step in this embodiment of the present invention, the steering angle and the vehicle speed are used to achieve a target steering-wheel torque 370. The target steering-wheel torque, as defined earlier in this section, is calculated using mathematical models.
    As an example of a method in accordance with the invention, the target steering-wheel torque includes one or more of the following torque contributions: lateral acceleration feedback torque, steering system friction torque, tyre friction torque, damping torque and steering-wheel self-alignment torque.
4. Control of the mentioned feedback torque actuator via a closed loop current control to achieve said target steering-wheel torque 380. Here, the target steering-wheel torque is first transformed to a target motor current, and this target motor current is compared with an actual motor current, where the difference between the two will form a control error. A controller is then used to minimise this control error to achieve the target current and hence the target steering-wheel torque.

In this way, the target steering-wheel torque is achieved without any disturbances at the same time as the target overlay angle is achieved.

The tyre friction torque takes into consideration the wheel angle, wheel angle history, vehicle position and vehicle velocity, which is important in the case of a low vehicle velocity since the tyre contact changes more quickly than the twisting of the tyre at high velocities. The steering system friction torque takes into consideration the fact that the steering system needs to have a certain friction for the driver to be able to rest against, so that the whole steering torque does not have to be given by the driver. A certain hysteresis is also needed so that the car is not felt to be "wobbly" or "unruly". The damping torque provides an important damping of the steering angle and thereby the vehicle response. Different damping outwards or inwards when driving straight ahead and when cornering can be preferable so that the damping will match the torque level and gradient. The steering-wheel self-alignment torque means the steering-wheel goes back to the straight-forward position also at velocities so low that there is no yaw and/or lateral vehicle state feedback. The steering-wheel self-alignment torque can be an interpolation table or a software function.

As an example of a method in accordance with the invention, the target steering-wheel torque is a function of one or more of the following variables: vehicle speed, steering angle, steering angle velocity and/or steering angle acceleration.

In this way, the parameters included in the target steering-wheel torque can be assessed in the event of a desired change in a vehicle state.

In a third embodiment, there is a hydraulic power assistance steering (HPAS) actuator below the angle overlay actuator assistance actuator. Here follows a list of such type of assistance actuators:
   In the case of an Orbitrol valve there is no direct mechanical connection between the steering member and the steering wheel
   In the case of an electrically or mechanically actuated hydraulic valve such as e.g. a 4/3 proportional valve or combinations of 3/3 proportional valves.
   Other valve combinations achieving the same result as the two examples described above.

All these examples of hydraulic power assistance actuators can in combination with all other embodiments build a full set of combinatory embodiments.

In order to describe the advantage of the above-mentioned embodiments, there is a need for an explanation of the difference between control with the target to achieve a certain assistance on one hand and the control to achieve a certain feedback to the driver. First of all, to have equilibrium (neglecting dynamical effects), the driver torque and all assistance torques shall be equal to the external torque, coming from the wheel forces through the steering system. The external torque cannot be controlled. Therefore, the only thing to be controlled is the total level of assistance. Now, the assistance can be controlled with two different control goals or targets:
1. Control with the target to achieve a certain assistance. Normally, this is done by the use of a so-called boost curve, where the assistance simply is a pre-defined, tuneable fraction of the external torque. Or in the case of a compensation torque for compensating for the dynamical effects of an angle overlay actuator, the assistance is controlled to reduce (but never to an ideal level by the fact that there are among others model, sensor and control errors reducing the effectiveness of the control). In both these cases, the control target is an assistance torque. Hence, the feedback torque is not controlled, but becomes what it becomes as the difference between the external torque and the assistance torque.
2. Control with the target to achieve a certain feedback to the driver. The assistance torque is here controlled by the use of closed-loop control with the target to achieve a certain feedback torque. Then, the level of assistance will become such that it both reduces the negative effects of an angle overlay actuator as well as external disturbances and even imperfections in the steering system. Hence, the feedback torque will be according to the target, i.e. according to the steering feel target. In order to control the feedback torque, there must be a torsion-bar torque sensor above all other assistance or angle overlay actuators. With this sensed torque, it is possible to do a closed-loop control so that the difference between the target feedback torque and the sensed torsion-bar torque is minimised.

In point 2 above, the feedback torque actuator is controlled to achieve a certain steering feel. Now, steering feel is the relation between the feedback torque and the vehicle response. It is important to have this relation consistent in order to be confident with the steering, i.e. that the vehicle behaves equal for the same steering input and vice versa. Because steering feel is the relation between the vehicle response and the feedback torque, the target for closed-loop control can be of two kinds, namely a target reference generator for a feedback torque calculated from a vehicle response or steering angle corresponding to a certain vehicle response (see further the description of the torque reference generator) or a target reference generator for a steering angle calculated from a steering-wheel torque (see further the description of the angle reference generator). Both methods result directly or indirectly in the fact that the feedback torque is controlled.

To summarize, it is beneficial to have one electric assistance actuator for cost, packaging as well as complexity reasons. Furthermore, it is beneficial to control this assistance actuator to achieve a certain feedback torque. Therefore, this actuator is referred to as a feedback torque actuator.

For heavy vehicles, the level of assistance is so high that there is a need for a hydraulic assistance actuator taking the majority of the assistance torque. However, in such a case there is still, mutatis mutandis beneficial with only one electrically controlled feedback torque actuator located above the angle overlay actuator.

As a further generalisation of the possible arrangements of actuators and sensors, the placement of the angle overlay actuator, the feedback torque actuator and potentially also the hydraulic assistance torque actuator can be arbitrary as long as the torsion-bar torque sensor is placed above these two or three actuators. Then closed-loop feedback torque control is possible and steering feel can be controlled to achieve the positive benefits of this invention.

In a fourth embodiment, the steering angle can be calculated in several ways, where they all have in common that they consist of an angle somewhere in the steering system that can be used to influence the lateral acceleration or curvature of the vehicle. Such steering angles can be:
  The articulation angle of an articulated vehicle.
  The rear-wheel steering angle in the case of a rear-wheel steered vehicle.
  A combination of the front-wheel angle and the rear-wheel angle in the case of an all-wheel steered vehicle.
  The front-wheel angle in the case of an assistance actuator described in embodiment four.

All these examples of steering angles can in combination with the other embodiments, build a full set of combinatory embodiments.

In a fifth embodiment, the driver torque is used as an input to a reference generator concept, an angle reference generator, so that the steering feel equation is used to achieve a target steering angle, which is possible to derive unambiguously as the target steering-wheel torque is a function of the, among others, the steering angle. The target overlay angle is then calculated by the use of the variable gear ratio and the additional overlay angle from the active safety functions such as e.g. oversteer compensation and/or understeer compensation and in the same way as in previous embodiments the feedback actuator and angle overlay actuator be controlled in order to achieve the target values respectively.

It shall be specifically noted that the feedback torque actuator can be controlled using any form of reference generator concept, where here a torque reference generator concept and an angle reference generator concept is mentioned. In order to be able to control the feedback torque felt by the driver, it is of great importance that the torque feedback actuator is above the angle overlay actuator, i.e. towards the steering wheel side, and in case of an additional hydraulic actuator, it can be mounted anywhere below the feedback torque actuator, i.e. towards the road wheel side, but preferably below the angle overlay actuator in order to reduce the torque to be handled by the angle overlay actuator.

Still other objects and features of the present invention will be apparent from the detailed description considered in conjunction with the accompanying drawings. It is to be understood, however, that the drawings are designed solely for purposes of illustration and not as a definition of the limits of the invention, for which reference should be made to the appended claims and the description as a whole. It should be further understood that the drawings are not necessarily drawn to scale and that, unless otherwise indicated, it is merely intended to conceptually illustrate the structures and procedures described herein.

The invention claimed is:

1. A method for controlling vehicle steering in a vehicle comprising a vehicle steering system comprising a feedback torque actuator arranged in series with an angle overlay actuator, the feedback torque actuator comprises an electric power assisted steering, the method comprising controlling said angle overlay actuator in such a way that a target overlay angle is achieved, wherein said feedback torque actuator is arranged above said angle overlay actuator, and in that the method comprises the steps of:
  controlling said angle overlay actuator so that a variable steering ratio as well as an additional overlay angle are provided, and controlling said feedback torque actuator in such a way that a target feedback torque is achieved and in such a way that a target steering feel is achieved, resulting in the angle overlay being controlled at the same time as the steering-wheel torque being controlled whereby a target overlay angle and a good steering feel is achieved; and
  controlling said feedback torque actuator by using a reference generator, wherein the controlling of the reference generator for achieving a target steering feel, a feedback torque to vehicle response relation describing steering feel, comprises a closed loop control method comprising calculating a reference or target overlay angle value, then controlling the steering assistance of the feedback torque actuator to minimize the error between the target overlay angle value and a corresponding measured overlay angle so that the target steering feel is achieved.

2. The method according to claim 1, wherein the controlling of said feedback torque actuator comprises controlling the reference generator to minimize a steering feel control error such that the target steering feel is achieved.

3. The method according to claim 1, wherein the reference generator is a feedback torque reference generator for the calculation of a target feedback torque and that the assistance torque is controlled so that the feedback torque error is minimized.

4. The method according to claim 1, wherein the reference generator is a steering angle reference generator for calculation of a target steering angle and that the assistance torque is controlled to minimize a steering angle error.

5. The method according to claim 1, wherein the steps of controlling the angle overlay actuator comprises the steps of:
  determining at least one of an actual steering angle, vehicle speed and overlay angle by measuring at least one input signal by means of at least one sensor.

6. The method according to claim 5, wherein the measurement of the at least one input signal comprises using a wheel speed sensor or a drive axle speed sensor, and in that the method further comprises the step of:

calculating the vehicle speed using said at least one input signal.

7. The method according to claim 5, further comprising the step of:
determining the steering angle, comprising any angle or rack position in the steering system, from an additional input signal from the at least one sensor comprising an angle or position sensor located in the steering column or elsewhere in the steering system, the steering angle being a sensed angle times a ratio between a rotation or translation of a sensor element of the sensor and the rotation at the reference steering angle.

8. The method according to claim 5, further comprising the steps of:
determining the angle overlay actuator angle, directly via an input signal or indirectly via a calculation based on two steering angles, one above and one below, the angle overlay actuator.

9. The method according to claim 5, further comprising the steps of:
calculating a variable gear ratio comprising a target ratio between the steering wheel and the road wheel;
using the variable gear ratio to calculate a target overlay angle, hence providing a target gear ratio from the target overlay angle and the current steering-wheel angle; and
controlling, by means of a controller, the overlay angle to minimize the deviation between the target overlay angle and the measured or calculated actual overlay angle.

10. The method according to claim 1, wherein the step of controlling the feedback torque actuator comprises the steps of:
determining an actual steering angle and vehicle speed by using at least one input signal provided by means of a sensor;
using the actual steering angle and the vehicle speed to calculate a target steering-wheel torque;
transforming the target steering-wheel torque to a target motor current;
comparing the target motor current with a measured, actual motor current; and
using a controller to minimize the difference between the target motor current and the measured, actual motor current.

11. The method according to claim 1, further comprising two actuators, the feedback torque actuator and the angle overlay actuator, and in that only the feedback torque actuator is closed-loop controlled.

12. The method according to claim 1, wherein the feedback torque actuator provides all steering assistance actuator functionality.

13. A vehicle steering system comprising:
a linkage between front axle road wheels and an angle overlay actuator, the linkage comprising a steering rack with associated tie rods connected via a pinion to the angle overlay actuator, a column axle, a feedback torque actuator comprising an assistance motor and an ECU for giving feedback to a driver, a steering wheel to which a driver applied driver torque, To, is applied and a torsion bar with a torsion-bar torque sensor,
wherein said feedback torque actuator is arranged above said angle overlay actuator, and in that said feedback torque actuator is adapted to be controlled in such a way that a target feedback torque is achieved and whereby a target steering feel is achieved, wherein the feedback torque actuator comprises an electric power assisted steering.

14. The vehicle steering system according to claim 13, wherein the angle overlay actuator comprises a planetary gear or a harmonic drive, an overlay measurement sensor and an ECU.

15. The vehicle steering system according to claim 13, further comprising means for controlling said angle overlay actuator so that a variable steering ratio as well as an additional overlay angle are provided, and for controlling said feedback torque actuator by the use of a reference generator so that the torque is controlled in such a way that a target steering feel is achieved, resulting in the angle overlay being controlled at the same time as the steering-wheel torque being controlled whereby a target overlay angle and a good steering feel is achieved.

16. The vehicle steering system according to claim 13, wherein, for controlling the angle overlay actuator the system further comprises at least one sensor for measuring at least one input signal for determining at least one of an actual steering angle, vehicle speed and overlay angle.

17. The vehicle steering system according to claim 16, wherein said at least one input signal is measured by the use of a wheel speed sensor or a drive axle speed sensor, and in that said at least one input signal is used for calculating the vehicle speed.

18. The vehicle steering system according to claim 16, further comprising an angle sensor located in the steering column or elsewhere in the steering system, and in that an additional input signal from said angle sensor is used for determining the steering angle.

19. The vehicle steering system according to claim 16, wherein the angle overlay actuator angle is determined directly via an input signal or indirectly via a calculation based on two steering angles, one above and one below the angle overlay actuator.

20. The vehicle steering system according to claim 16, further comprising means for calculating a variable gear ratio comprising a target ratio between the steering wheel and the road wheel, said variable gear ratio being used for calculation of a target overlay angle, hence providing a target gear ratio from the target overlay angle and the current steering-wheel angle, and in that it further comprises a controller for controlling the overlay angle to minimize the deviation between the target overlay angle and the measured or calculated actual overlay angle.

21. The vehicle steering system according to claim 13, wherein, for controlling the feedback torque actuator, said sensors are used for providing at least one input signal for determining an actual steering angle and vehicle speed, said determined actual steering angle and vehicle speed being used for calculation of a target steering-wheel torque, further comprising means for transforming said target steering-wheel torque to a target motor current, and for comparing the target motor current with a measured, actual motor current, and, by means of a controller, minimizing the difference between the target motor current and the measured, actual motor current.

22. The vehicle steering system according to claim 13, further comprising two actuators, the feedback torque actuator and the angle overlay actuator, and in that only the feedback torque actuator is closed-loop controlled.

23. The vehicle steering system according to claim 13, the the feedback torque actuator provides all steering assistance actuator functionality.

24. The vehicle steering system according to claim 13, further comprising a hydraulic assistance actuator to which the tie rods are connected via the pinion, such that the angle overlay actuator will be disposed between said hydraulic assistance actuator and the feedback torque actuator.

\* \* \* \* \*